US012763517B2

(12) United States Patent
Ripper et al.

(10) Patent No.: US 12,763,517 B2
(45) Date of Patent: Oct. 13, 2026

(54) HOUSING ASSEMBLY, CONNECTOR AND CONNECTION DEVICE

(71) Applicant: TE Connectivity Solutions GmbH, Schaffhausen (CH)

(72) Inventors: Hartmut Ripper, Bensheim (DE); Gabriel Hotea, Bensheim (DE); Benjamin Becker, Bensheim (DE); Joe-Anne Lingos, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 344 days.

(21) Appl. No.: 18/637,757

(22) Filed: Apr. 17, 2024

(65) Prior Publication Data

US 2024/0356280 A1 Oct. 24, 2024

(30) Foreign Application Priority Data

Apr. 19, 2023 (DE) ........................ 102023109903.5

(51) Int. Cl.
*H01R 13/627* (2006.01)
*H01R 13/506* (2006.01)
*H01R 13/648* (2006.01)

(52) U.S. Cl.
CPC ....... *H01R 13/6272* (2013.01); *H01R 13/506* (2013.01); *H01R 13/648* (2013.01)

(58) Field of Classification Search
CPC ........................ H01R 13/6272; H01R 13/506; H01R 13/648; H01R 13/6585; H01R 13/4223;

(Continued)

(56) References Cited

U.S. PATENT DOCUMENTS 5,066,243 A * 11/1991 Nuesslein ............ H01R 13/422 439/460
5,419,722 A * 5/1995 Onoda ............... H01R 13/4223 439/752

(Continued)

FOREIGN PATENT DOCUMENTS

| | | | |
|---|---|---|---|
| DE | 102020202212 | A1 | 8/2021 |
| EP | 3336970 | B1 | 6/2018 |
| JP | H06223909 | A | 8/1994 |

OTHER PUBLICATIONS

Office Action for corresponding EP Application No. 24170823.9 dated Jul. 15, 2025 (6 pages).

(Continued)

*Primary Examiner* — Abdullah A Riyami
*Assistant Examiner* — Nader J Alhawamdeh
(74) *Attorney, Agent, or Firm* — Jay J. Hoette; Carroll, Hoette & Butscher, LLC

(57) ABSTRACT

A housing assembly for a connector includes a contact housing and a shield element, wherein the contact housing includes a contact chamber for receiving a contact unit of the connector, a latching section which is movable between a latching position and a release position and which is configured in the latching position to enter into a latching connection with the contact unit to be received, a blocking section which is connected to the latching section in a motion-transmitting manner, and a shield receptacle which is configured to receive at least in part the shield element, where the blocking section projects at least in part into the shield receptacle when the latching section is located in its release position. A connector as well as to a connection device are provided including such housing assembly.

20 Claims, 7 Drawing Sheets

(58) Field of Classification Search
CPC .......................... H01R 13/6271; H01R 13/639; H01R 13/641; H01R 13/6581
See application file for complete search history.

(56) References Cited

U.S. PATENT DOCUMENTS

| | | | | |
|---|---|---|---|---|
| 5,421,744 | A | 6/1995 | Hio | |
| 5,518,428 | A * | 5/1996 | Onoda ............... | H01R 13/4223 439/752 |
| 2011/0034081 | A1* | 2/2011 | Feldman ............ | H01R 13/6583 439/607.35 |
| 2019/0067882 | A1 | 2/2019 | Kumamoto et al. | |
| 2020/0036140 | A1 | 1/2020 | Iwamoto et al. | |
| 2020/0161782 | A1 | 5/2020 | Iwamoto | |
| 2021/0151923 | A1* | 5/2021 | Maesoba ............ | H01R 13/4362 |
| 2024/0356280 | A1* | 10/2024 | Ripper ............... | H01R 13/4223 |

OTHER PUBLICATIONS

Search Report for corresponding Application No. 102023109903.5 dated Dec. 19, 2023 (5 pages).
Office Action for corresponding KR Application No. 2025063848800 dated Jul. 4, 2025 (6 pages).
Office Action for corresponding JP Application No. 2024065903 dated Apr. 8, 2025 (9 pages).
Extended European Search Report for corresponding Application No. 24170823.9 dated Sep. 17, 2024 (6 pages).

* cited by examiner

HOUSING ASSEMBLY, CONNECTOR AND CONNECTION DEVICE

CROSS REFERENCE TO RELATED APPLICATIONS

This application claims the benefit of DE Application No. 102023109903.5, filed 19 Apr. 2023, the subject matter of which is herein incorporated by reference in its entirety.

BACKGROUND OF THE INVENTION

The subject matter herein relates to a housing assembly for a connector for a signal, high-frequency, and/or data line.

Many fields of technology use shielded connection devices with connector housings in which contact units are positioned in a latching manner. The contact units can be individual contact elements (e.g. so-called crimp terminals) or contact mounts with several contact elements.

The constant effort to miniaturize the connection devices leads to components as few as possible and as space-saving as possible needing to be used. In addition, positioning errors with respect to the contact units in the respective connector housing often occur. If left undetected, these positioning errors can lead to transmission problems or even to a complete failure of the respective line.

There is a need for devices that make connection devices have few components, be compact and reliable.

BRIEF DESCRIPTION OF THE INVENTION

In one embodiment, A housing assembly for a connector includes a contact housing and a shield element, wherein the contact housing includes a contact chamber for receiving a contact unit of the connector, a latching section which is movable between a latching position and a release position and which is configured in the latching position to enter into a latching connection with the contact unit to be received, a blocking section which is connected to the latching section in a motion-transmitting manner, and a shield receptacle which is configured to receive at least in part the shield element, where the blocking section projects at least in part into the shield receptacle when the latching section is located in its release position. As long as the latching section does not in its latching position enter into the latching connection, the blocking section then blocks the shield receptacle. Consequently, the shield element cannot be inserted into the shield receptacle, whereby a TPA function is implemented. Furthermore, a connector as well as to a connection device are provided including such housing assembly.

For the sake of better readability of the specification, only the singular of some features of the housing assembly is mentioned, although the plural of these features can also be present. For example, the contact housing comprises at least one contact chamber, at least one latching section, and at least one blocking section.

An advantage of the subject matter herein arises when the housing assembly is installed in a connector. It can be intended during installation to first insert the contact unit into the contact chamber (in the absence of the shield element). Normally, the contact unit and the latching section enter into said latching connection, wherein the latching section alternates between its release position and its latching position at least once. The shield element is subsequently inserted into the shield receptacle.

As long as the latching section is still located in its release position, the blocking section blocks the shield receptacle by projecting into the shield receptacle. Consequently, the shield element cannot be inserted into the shield receptacle in this state. At the same time, this state indicates that the latching section is not in said latching connection with the contact unit inserted, since the latching section is obviously located in its release position and in particular not in its latching position.

In other words, the latching section cannot go to the latching position and remains in the release position should the contact unit not be "seated" properly in the contact chamber. Consequently, the blocking section then prevents the insertion of the shield element into the shield receptacle, which is noticed by the assembly staff and taken as a cause to examine the contact unit for positioning errors.

In addition to the actual shielding function, the shield element therefore fulfills a so-called TPA function (Terminal Position Assurance). Due to the integration of this function into the pre-existing shield element, no additional TPA element is necessary as a separate component.

The contact housing and the shield element can also be provided, not necessarily present as part of the housing assembly, but instead separate and independent of one another.

Embodiments herein can be further improved by the further developments that are advantageous on their own and can be combined arbitrarily.

According to a possible embodiment, the contact housing can be made of electrically insulating material in order to prevent short circuits and increase electrical safety. The shield element can in turn be made of electrically conductive material in order to improve the shielding effect.

The contact chamber preferably leads through the contact housing so that the contact chamber is accessible from one side for a mating contact and a wire or cable can lead to the contact unit on an opposite side.

The latching section in the latching position can optionally project at least in part into the contact chamber. This means that there is no need for any latching arms on the outside of the contact unit (so-called clean body terminal), which latching arms could possibly break off when the contact unit is being transported.

As already mentioned, the blocking section projects into the shield receptacle when the latching section is located in the release position. For this purpose, the shield receptacle can form an evasion recess which is configured to receive (in the absence of the shield element) at least in part the blocking section when the at least one latching section is located in its release position.

Furthermore, the shield receptacle can extend at least in sections along, in particular parallel to, the contact chamber. Furthermore, the shield receptacle can surround the contact chamber from at least three, in particular four, adjacent sides that are perpendicular to one another in pairs. If the contact housing comprises several contact chambers, each contact chamber can be surrounded by the shield receptacle from three or four pairs of mutually perpendicular sides. Consequently, the shield element in the shield receptacle surrounds the contact chambers and the contact units received therein from a corresponding number of sides.

The shield element can of course also surround the received contact units from several sides that are not perpendicular to one another, as long as the enclosing angle of the shield element with respect to the respective contact unit is at least 270°. In other words, the shield element encloses at least 75% of the circumference of the contact units received in the contact chambers. The shield element can be, for example, a punched and bent member with a U profile, hollow profile, round profile, polygonal profile, H profile, double U-profile, or double T profile.

In order to simplify the reception of the shield element, the shield receptacle can be open at one side in a shield insertion direction. In particular, the shield receptacle can be accessible from the shield insertion direction. For better attachment to the contact housing after its reception in the shield receptacle, the shield element can comprise an attachment section with which the shield element can be attached to the contact housing. For example, the shield element can comprise one or more latching tabs that latch into a corresponding number of latching recesses or latching edges within the shield receptacle.

In order to be able to reliably fulfill the TPA function already mentioned, the shield element can have a detection section which preferably projects from the remainder of the shield element in the shield insertion direction. The shield element can then be inserted into the shield receptacle with the detection section first, wherein the detection section strikes against the blocking section provided that it blocks the shield receptacle.

According to a further possible embodiment, the shield element in the shield receptacle can oppose the motion of the latching section to its release position. In particular, the shield element can comprise a lock section that can be received in the evasion recess already mentioned. The lock section can be configured to abut against the blocking section. Preferably, the detection section and the lock section can concur, coincide with or correspond to one another.

This means, without a shield element in the shield receptacle, in particular without a lock section in the evasion recess, the latching section can be moved to the release position at any time and the contact unit can consequently be installed in the contact chamber. The contact unit can also potentially leave the contact chamber again (intentionally or unintentionally), provided that the latching section is moved to the release position for this purpose. However, once the shield element is in the shield receptacle, in particular the lock section is in the evasion recess, the shield element blocks, prevents, or disables this motion of the latching section and thereby fulfills a secondary securing function, whereby the contact unit can no longer be removed from the contact chamber. In particular, the shield element received in the shield receptacle in the latching position blocks the latching section.

The latching section can be movable subject to temporary or permanent elastic deformation, pivoting, or bending. For example, according to an easy-to-produce embodiment, the latching section can be formed by a self-supporting latching lance. The latching lance can in turn be formed integrally with the contact housing. Alternatively, the latching section can also be arranged on a separate slide or tilting mechanism which is held to be movable in the contact housing and is optionally preloaded by a tension spring in the direction of the latching position or the release position.

For the latching section to not be permanently loaded in the latching position, the lock section already mentioned can abut against the blocking section without force. This means that the lock section preferably does not press upon the blocking section and the latching section connected thereto in a motion-transmitting manner, but restricts their movability.

To further simplify the housing structure, the latching section and the blocking section can be connected integrally. For example, the blocking section is also formed by the latching lance already mentioned, where the latching section and the blocking section are arranged together at a free or distal end of the latching lance. Preferably, the latching section and the blocking section are arranged on oppositely disposed sides of the free or distal end with respect to the latching lance. In the case of the slide or tilting mechanism likewise already mentioned, the latching section and the blocking section can each also be arranged on oppositely disposed sides.

The latching lance can optionally extend at least in sections between the contact chamber and the evasion recess. The latching section can there be facing towards the contact chamber and the blocking section towards the evasion recess. This gives rise to a simple motion sequence because the latching lance can be pivoted from the contact chamber into the evasion recess and vice versa.

Furthermore, the free or distal end of the latching lance can point in the shield insertion direction. In other words, a proximal end of the latching lance is arranged in the shield insertion direction forward of the free or distal end of the latching lance. This prevents the shield element from getting caught on the latching lance when it is pushed into the shield receptacle and the latching lance from possibly bending or even breaking off.

Furthermore, the free or distal end of the latching lance can point in the direction opposite to the shield insertion direction. In this case, the free or distal end of the latching lance is arranged in the shield insertion direction forward of the proximal end of the latching lance. In this embodiment, the TPA function already explained of the shield element takes effect comparatively early, without the shield element having to be pushed too far into the shield receptacle. This can result in time saving.

As already indicated above, the contact housing can comprise two contact chambers that run parallel to one another at least in sections. This means that the field of application of the housing assembly can be expanded to include connectors with two contact units.

The shield receptacle can run at least in sections between the two contact chambers. Accordingly, the shield element in the shield receptacle can shield the two contact units from each other.

The latching section, the blocking section, and/or the lock section can likewise extend at least in sections between the two contact chambers. This space-saving arrangement of the latching section, the blocking section, and/or the lock section results in a compact housing assembly.

The contact housing can optionally comprise two latching sections which are configured to be movable in their respective latching position or their respective release position toward or away from one another. In particular, a separate latching section can be provided for each contact chamber. This makes it possible to install the contact units individually and independently of one another in the respective contact chambers.

A separate evasion recess can be present for each latching section. A separate blocking section and/or a separate lock section can in turn be provided for each evasion recess. Alternatively, a common evasion recess can be provided for all latching sections. A common blocking section and/or a common lock section is then sufficient.

The underlying object mentioned at the outset can also be satisfied by a connector with a housing assembly according to one of the above embodiments and a contact unit for contacting a mating contact of a mating connector. The contact unit is then received in the contact chamber of the contact housing and is in a latching connection with the latching section, wherein the shield element is received in the shield receptacle and secures the latching connection.

For the sake of better readability of the specification, only the singular of some features of the housing assembly is mentioned, although the plural of these features can also be present. For example, the connector comprises at least one contact unit.

The connector benefits from the advantages already explained of the housing assembly. In particular, the mere fact that the shield element is received in the shield receptacle is an indication of the correct positioning of the contact unit in the contact chamber (i.e. TPA function). It is also ensured that no positioning errors can occur in the future when the contact unit moves (secondary securing function).

A connection device with the above connector and with a mating connector that is configured to be complementary to the connector also satisfies the object set out at the outset, wherein the connector and the mating connector are configured to be plugged together, and where the shield element of the connector in the state plugged together projects at least in sections into the mating connector. The mating connector can comprise a connector housing configured analogously to the contact housing of the connector. A mating contact of the mating connector can be received in a latching manner in the connector housing, wherein the mating contact is configured to be complementary to and plugged together with the contact unit.

For the sake of better readability of the specification, only the singular of some features of the housing assembly is mentioned, although the plural of these features can also be present. For example, the connection device comprises at least one mating contact.

The connection device benefits from the advantages already explained of the housing assembly and the connector. It is particularly advantageous to have the connection device make do with a single shield element for both connectors, since the shield element also extends into the mating connector.

When plugged together, the shield element preferably surrounds the mating contact of the mating connector at least in sections from at least three, in particular four, adjacent sides that run perpendicularly or obliquely to one another in pairs. The enclosing angle of the shield element with respect to the mating contact is at least 270°. In other words, the shield element encloses at least 75% of the circumference of the mating contact.

The shield element can optionally secure a further latching connection between the mating contact and the mating connector. In other words, the shield element can fulfill an analogous TPA function and a secondary securing function also for the mating contact.

To simplify the pre- and/or final assembly of the shield element, the shield element with its attachment section already mentioned can alternatively or cumulatively be configured to be attachable to the mating connector. This means that, in addition to or instead of the latching tabs already mentioned, which latch with latching recesses or latching edges of the shield receptacle, the shield element can comprise latching tabs that latch with latching recesses or latching edges of the mating connector.

The invention shall be explained hereafter in more detail with reference to the drawings on the basis of several exemplary embodiments, the different features of which may be combined with one another as required in accordance with the above observations. In particular, individual features can be added to the described embodiments in accordance with the above explanations if the effect of these features is necessary for a specific application. Conversely, individual features can be omitted from the existing embodiments if the technical effect of these features is not important in a specific application. Similar, identical, and functionally identical elements in the drawings are provided with the same reference numerals to the extent as appropriate.

DETAILED DESCRIPTION OF THE INVENTION

Figure 1:
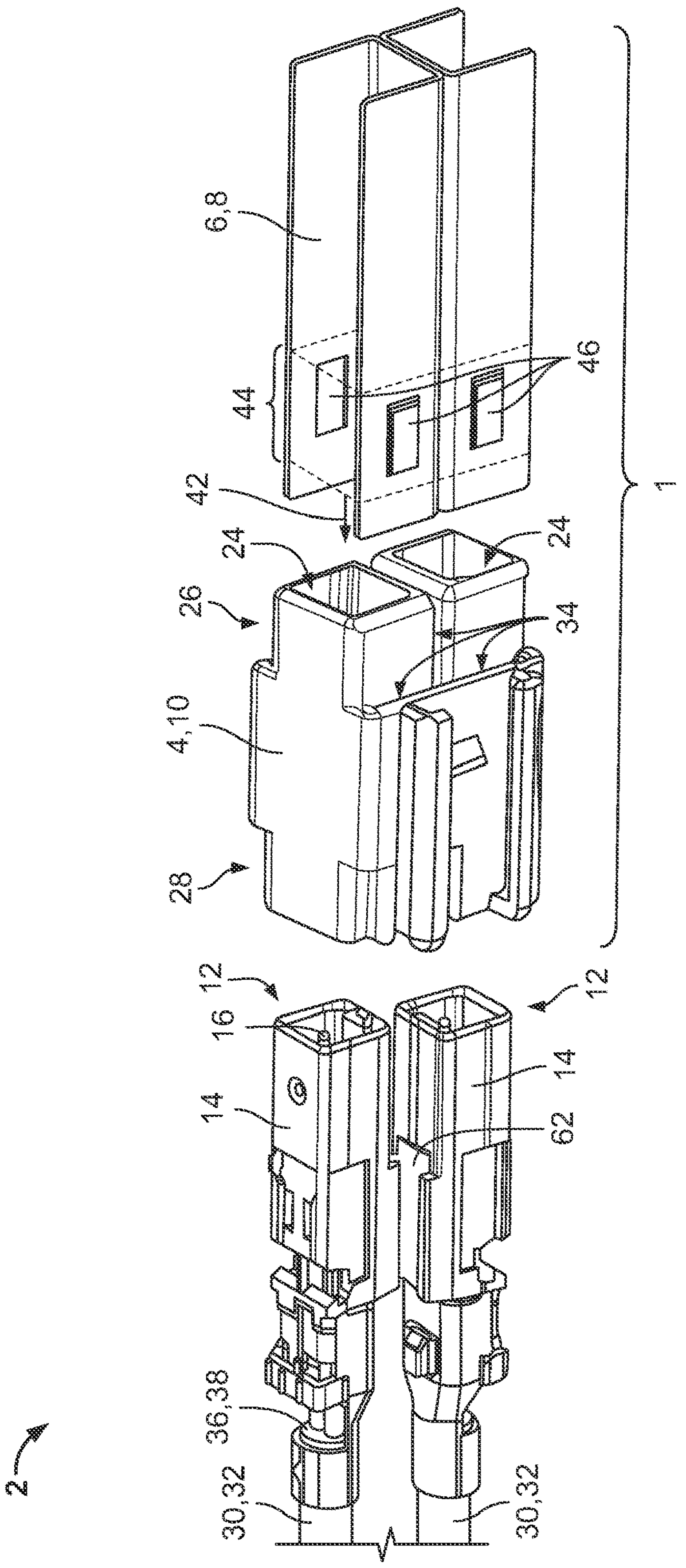
FIG. 1 shows a schematic perspective view of a connector according to a first exemplary embodiment as an exploded illustration.

FIGS. 1 to 3 and 6 show a housing assembly 1 as part of a connector 2 in various views and embodiments. Housing assembly 1 comprises a contact housing 4 made of electrically insulating material (e.g. plastic material) and a shield element 6 made of electrically conductive material (e.g. metal). FIGS. 7 to 10 show exemplary processing steps of shield element 6 during its production, which shall be explained in more detail hereinafter. In particular, shield element 6 can be a punched and bent member 8. Contact housing 4 can be an injection molded member 10.

Figure 4:
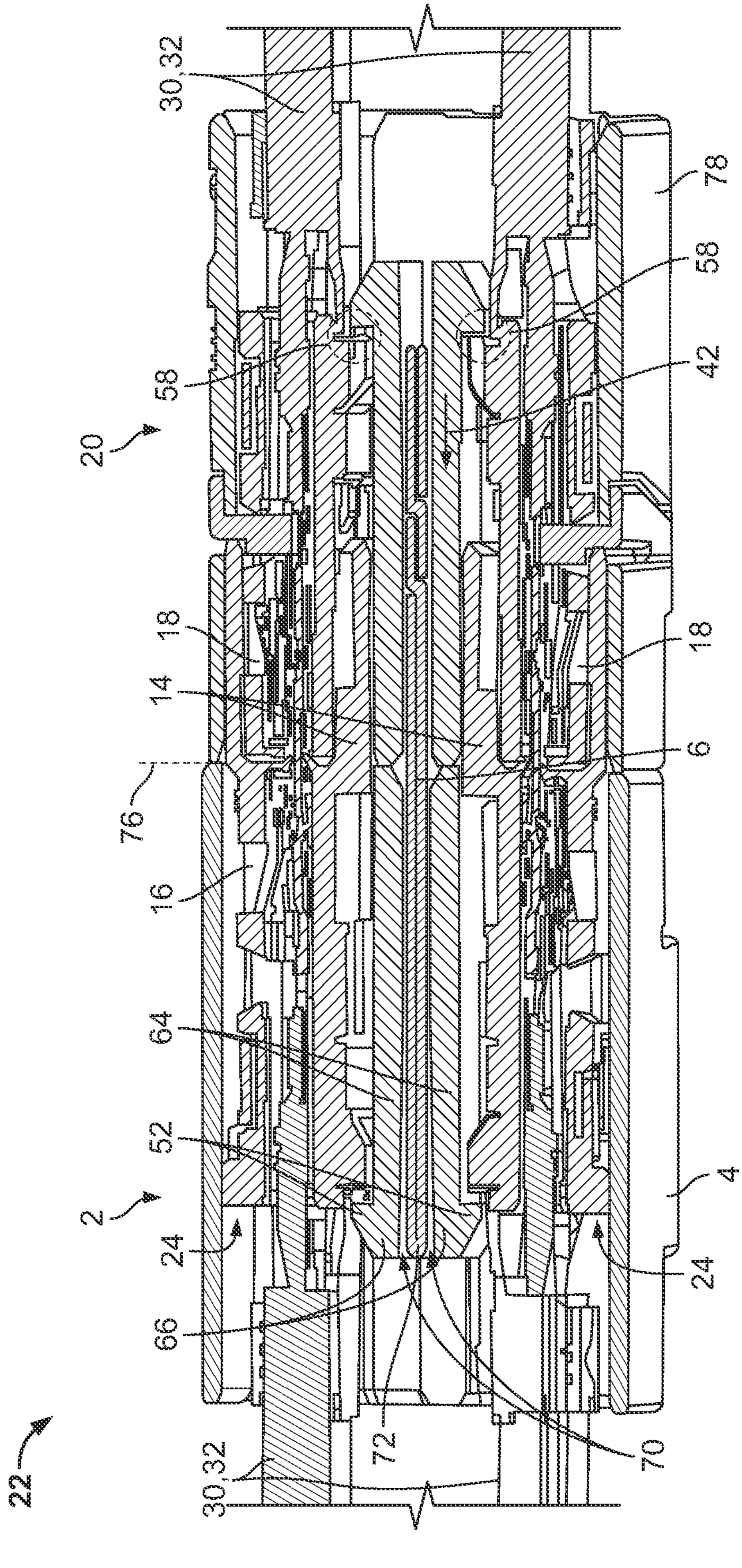
FIG. 4 shows a schematic sectional view of a connection device according to an exemplary embodiment.
Figure 5:
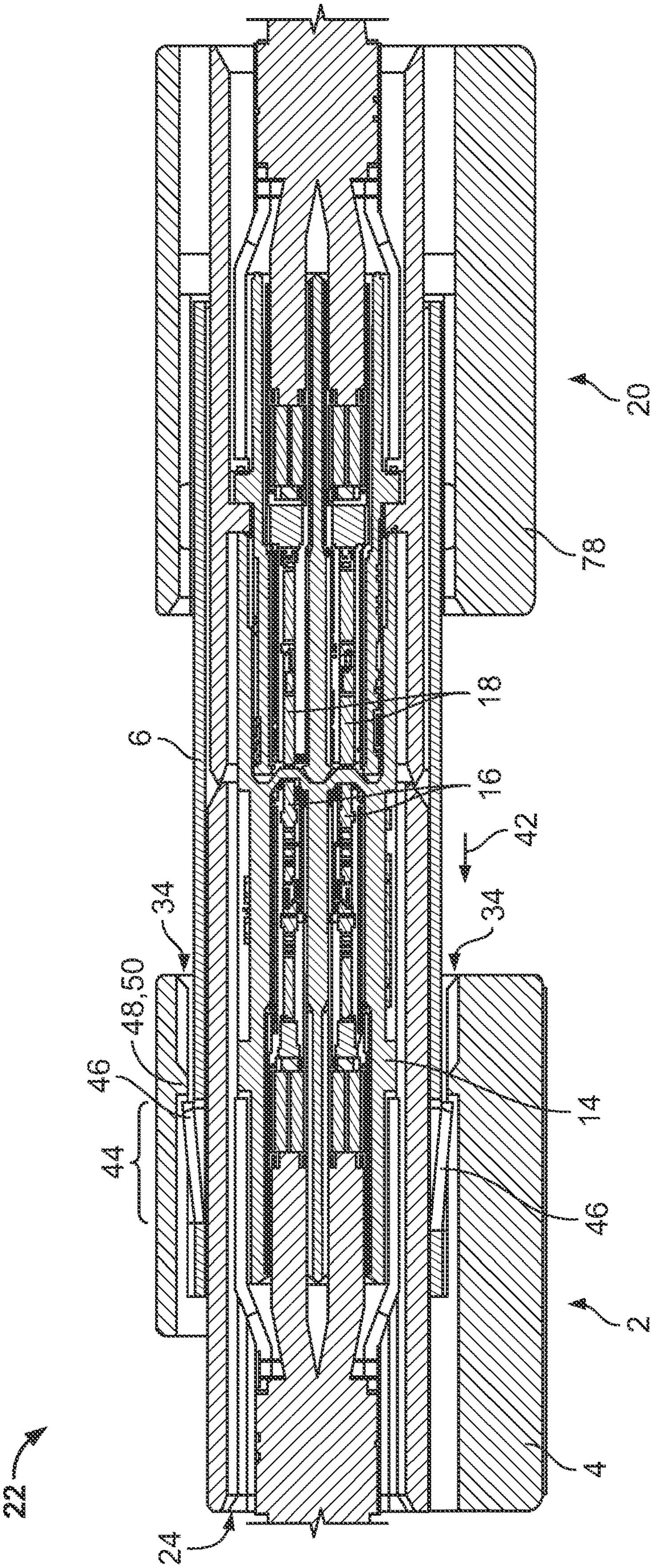
FIG. 5 shows a further schematic sectional view of the connection device from FIG. 4.

Apart from housing assembly 1, connector 2 comprises at least one contact unit 12. Contact unit 12 can comprise a contact mount 14 with several contact elements 16. In the embodiments shown, connector 2 comprises two such contact units 12. Alternatively, the contact units can be individual contact elements (e.g. so-called crimp terminals). Contact units 12 are used to each contact a mating contact 18 of a mating connector 20 of a connection device 22. Connection device 22 is shown in FIGS. 4 and 5.

As can be seen in FIG. 1, contact housing 4 comprises a respective contact chamber 24 each for receiving one contact unit 12 of connector 2. The respective contact chamber 24 preferably leads through contact housing 4 so that contact chamber 24 is accessible to the associated mating contact 18 from one side 26, and a wire 30 or cable 32 can lead to contact unit 12 on an opposite side 28. According to the embodiment shown, contact housing 4 can comprise two contact chambers 24 for two contact units 12 which run parallel to one another at least in sections.

It can also be seen in FIG. 1 that contact housing 4 comprises a shield receptacle 34 which is configured to receive shield element 6 at least in part. Shield receptacle 34 can extend at least in sections along, in particular parallel to, contact chambers 24. In particular, shield receptacle 34 extends to a point in the contact housing to which a shield braid 36 or a shield film 38 of wire 30 or cable 32 leading to the respective contact unit 12 extends.

Furthermore, shield receptacle 34 can run at least in sections between the two contact chambers 24. Accordingly, shield element 6 in shield receptacle 34 can shield the two contact units 12 in the two contact chambers 24 from each other.

In addition, shield receptacle 34 can surround contact chambers 24 from at least three adjacent sides. Shield element 6 in shield receptacle 34 then likewise surrounds contact chambers 24 and contact units 12 received therein from three sides. However, if 360° shielding is necessary, shield receptacle 34 and shield element 6 can each surround contact chambers 24 from four sides.

Figure 7:
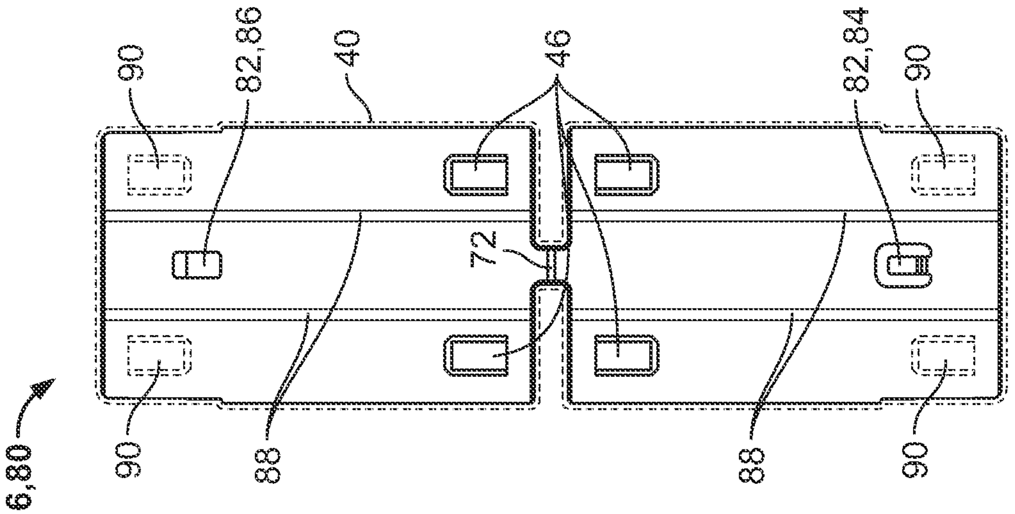
FIG. 7 shows a schematic illustration of a punched contour of a shield element according to an exemplary embodiment.

Shield element 6 can be a punched and bent member with a punched contour 40 shown in FIG. 7. By successive bending (see FIGS. 8 to 10), shield element 6 can be given a double U profile, an H profile, or a double T profile, as shown in FIG. 1. The double T profile is particularly suitable for surrounding two contact chambers 24 from three sides each. If contact housing 4 only comprises one contact chamber, a simple U profile (not shown) is sufficient. For the 360° shielding already mentioned, it is advisable to configure shield element 6 with a hollow profile (not shown).

In order to simplify the reception of shield element 6, shield receptacle 34 can be open at one side in a shield insertion direction 42. For better attachment to contact housing 4 after its reception in shield receptacle 34, shield element 6 can comprise an attachment section 44 with which shield element 6 can be attached to contact housing 4. For example, the shield element can comprise one or more latching tabs 46 which latch with a corresponding number of latching recesses 48 or latching edges 50 within shield receptacle 34.

Figure 2:
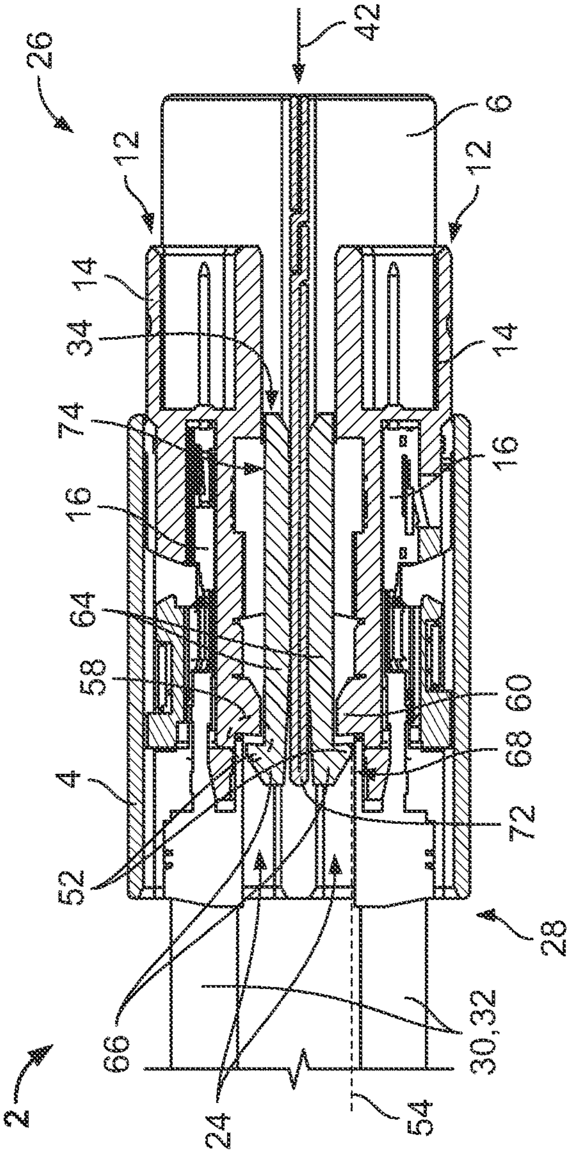
FIG. 2 shows a schematic sectional view through the connector from FIG. 1.

As can be seen from the sectional illustration of FIG. 2, contact housing 4 comprises a latching section 52 in each contact chamber 24. A separate latching section 52 is preferably provided for each contact chamber 24. Each latching section 52 is movable between a latching position 54 (see FIGS. 2 and 3) and a release position 56 (see FIG. 6). The two latching sections 52 shown in FIG. 2 are configured to be movable in their respective latching position 54 or their respective release position 56 towards or away from each other.

Furthermore, each latching section 52 is configured in latching position 54 to form a latching connection 58 with contact unit 12 received. For this purpose, each latching section 52 in its latching position 54 can project at least in part into the associated contact chamber 24. There, latching section 52 can engage behind a latching edge 60 of contact unit 12, as shown in FIG. 2. Alternatively, latching section 52 can engage in a latching recess 62 of contact unit 12 (see FIG. 3).

Each latching section 52 can be movable subject to temporary or permanent elastic deformation, pivoting, or bending. For example, each latching section 52 can be formed by a self-supporting latching lance 64. Latching lance 64 can in turn be formed integrally with contact housing 4. Alternatively, the latching section can also be arranged on a separate slide (not shown) or tilting mechanism (not shown) which is held to be movable in the contact housing and optionally preloaded by a tension spring (not shown) in the direction of the latching position or the release position.

In order to detect positioning errors of contact units 12, contact housing 4 comprises for each latching section 52 a blocking section 66, the function of which shall be explained hereafter.

Each blocking section 66 is connected to its associated latching section 52 in a motion-transmitting manner. In particular, latching section 52 and blocking section 66 can be connected integrally. For example, blocking section 66 as well as associated latching section 52 are formed by latching lance 64 already mentioned, where latching section 52 and blocking section 66 are arranged together at a free or distal end 68 of the latching lance. Preferably, latching section 52 and blocking section 66 are arranged on oppositely disposed sides of free or distal end 68 with respect to latching lance 64.

Figure 6:
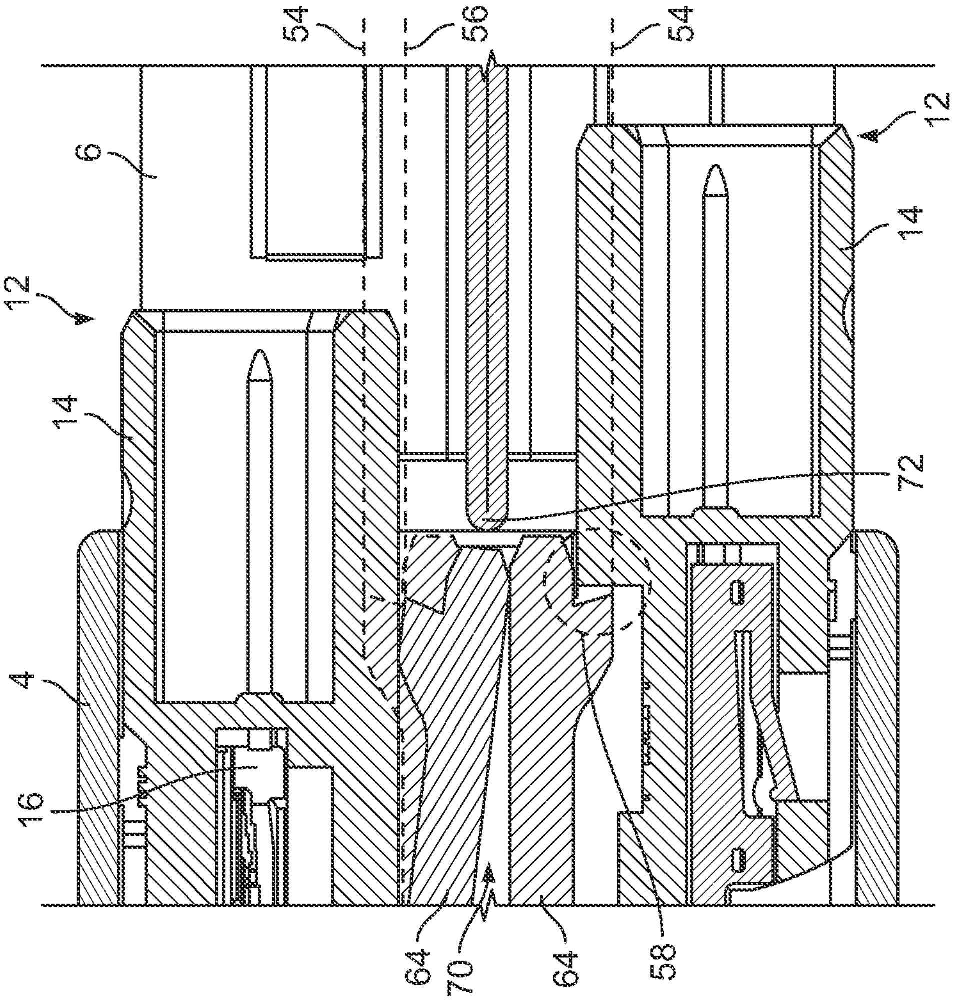
FIG. 6 shows a detailed view from FIG. 3.
Figure 8:
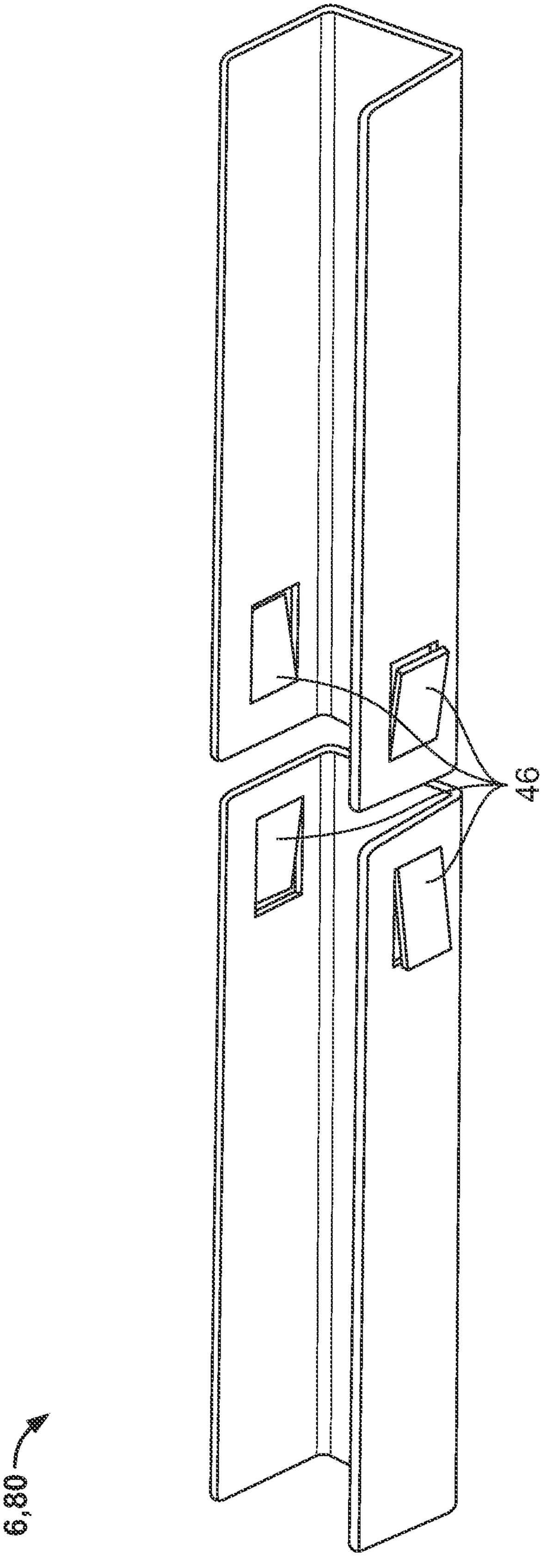
FIG. 8 shows a schematic perspective illustration of a subsequent step in the further processing of the shield element from FIG. 7.
Figure 10:
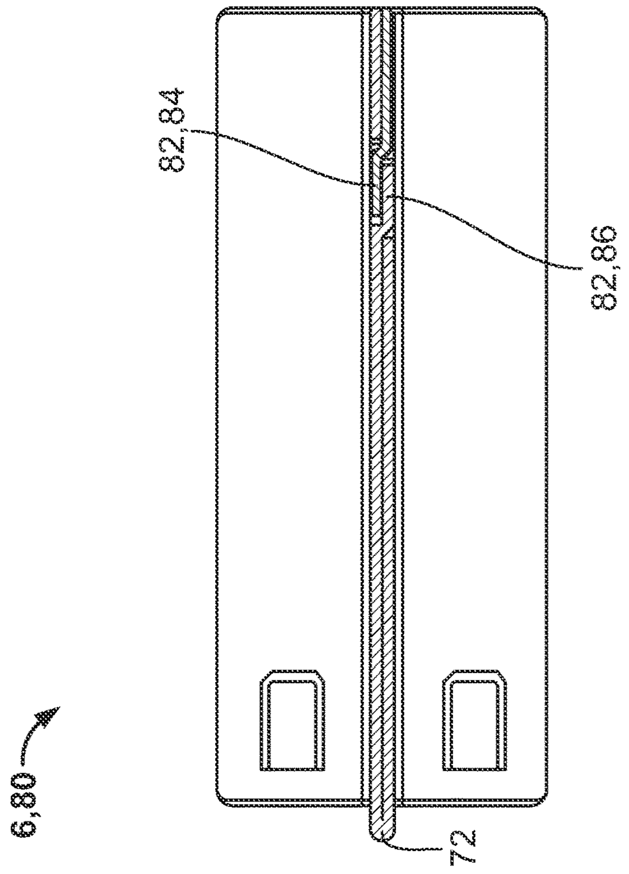
FIG. 10 shows a schematic sectional illustration of a subsequent step in the further processing of the shield element from FIG. 9.
Figure 9:
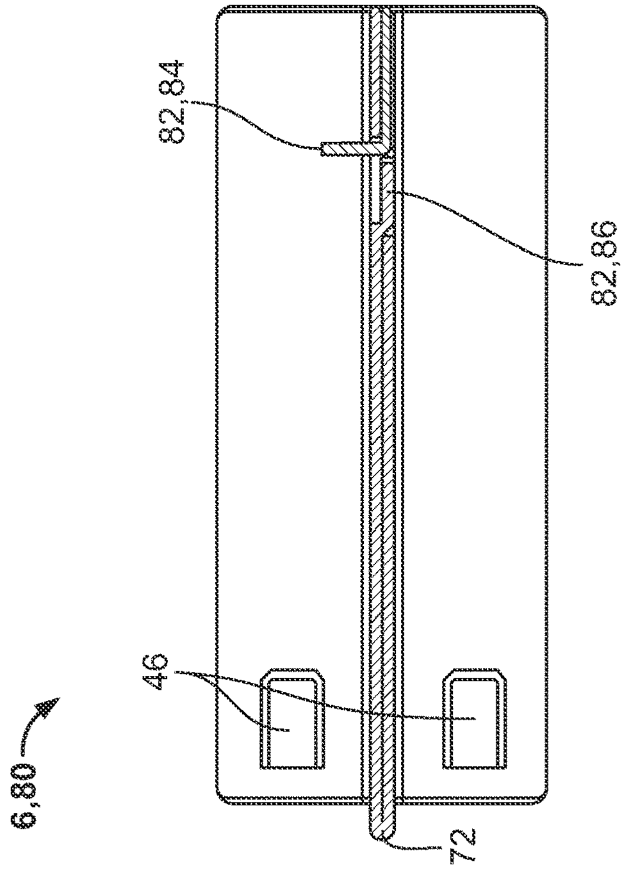
FIG. 9 shows a schematic sectional illustration of a subsequent step in the further processing of the shield element from FIG. 8.

Furthermore, the respective blocking section 66 projects at least in part into shield receptacle 34 when associated latching section 52 is located in its release position 56 (see FIG. 6). For this purpose, shield receptacle 34 can form an evasion recess 70 which is configured to receive blocking section 66 at least in part (in the absence of the shield element) when the at least one latching section 52 is located in its release position 56 or at least away from its latching position 54.

If, when assembling the connector, it is intended to first insert contact units 12 into contact chambers 24 and only thereafter insert shield element 6 into shield receptacle 34, shield element 6 can have, in addition to the actual shielding function, a so-called TPA function (Terminal Position Assurance) which can be used to identify positioning errors of contact units 12.

As a rule, contact units 12 and latching sections 52 each form said latching connection 58 during assembly, where each latching section 52 alternates between its release position 56 and its latching position 54 at least once. This change in position creates a clicking noise, but which can easily be missed, especially in noisy factory halls.

For this reason, it often happens that a contact unit 12 is not "seated" properly in the contact chamber and does not establish latching connection 58 with latching section 52. In this state, blocking section 66 blocks shield receptacle 34 by projecting into shield receptacle 34, in particular since latching section 52 remains in its release position 56 or is at least not located in its latching position 54. Consequently, shield element 6 cannot be inserted into shield receptacle 34 in this state. This is noticed by the assembly staff and is taken as an opportunity to verify contact unit 12 for positioning errors.

Blocking section 66, in cooperation with shield element 6, can also ensure that positioning errors caused by unintentional displacement of contact units 12 are prevented, as shall be explained hereafter.

For this purpose, shield element 6 in shield receptacle 34 can oppose the motion of latching section 52 to its release position 56. In particular, shield element 6 can comprise a lock section 72 that can be received in evasion recess 70 already mentioned and is configured to abut against blocking section 66 (see FIGS. 2 and 3). For example, lock section 72 can preferably project from the remainder of shield element 6 in shield insertion direction 42. Lock section 72 can also serve as a detection section and strike against blocking section 66 when blocking section 66 blocks shield receptacle 34.

This means that the shield element blocks, prevents, or disables the motion of latching section 52 to its release position 56 once shield element 6 is located in shield receptacle 34, in particular lock section 72 is located in evasion recess 70. Only without a shield element 6 in shield receptacle 34, in particular without a lock section 72 in evasion recess 70, can latching section 52 be moved to release position 56 and contact unit 12 be removed from contact chamber 24 in a non-destructible manner. Likewise, contact unit 12 can be installed in contact chamber 24 only in the absence of shield element 6. Shield element 6 therefore fulfills a secondary securing function which secures latching connection 58.

A common evasion recess 70 can be provided for all latching sections 52. Accordingly, a common lock section 72 is sufficient. According to an alternative embodiment, not shown, a separate evasion recess can be present for each latching section. A separate lock section 72 can then be provided for each evasion recess.

For latching section 52 to not be permanently loaded in latching position 54, lock section 72 already mentioned can abut against blocking section 66 without force. This means that lock section 72 preferably does not press upon blocking section 66 and latching section 52 connected thereto in a motion-transmitting manner and merely restricts their mobility.

Latching section 52, blocking section 66, and/or lock section 72 can extend at least in sections between two contact chambers 24. Furthermore, latching lance 64 can extend at least in sections between associated contact chamber 24 and evasion recess 70. Latching section 52 can there be facing towards contact chamber 24 and blocking section 66 towards evasion recess 70. Furthermore, free or distal end 68 of latching lance 64 can point in shield insertion direction 42, as shown in FIG. 2. In other words, a proximal end 74 of latching lance 64 is arranged in shield insertion direction 42 forward of free or distal end 68 of latching lance 64. This prevents shield element 6, when being pushed into shield receptacle 34, from getting caught on latching lance 64 and from possibly bending or even breaking it off.

Figure 3:
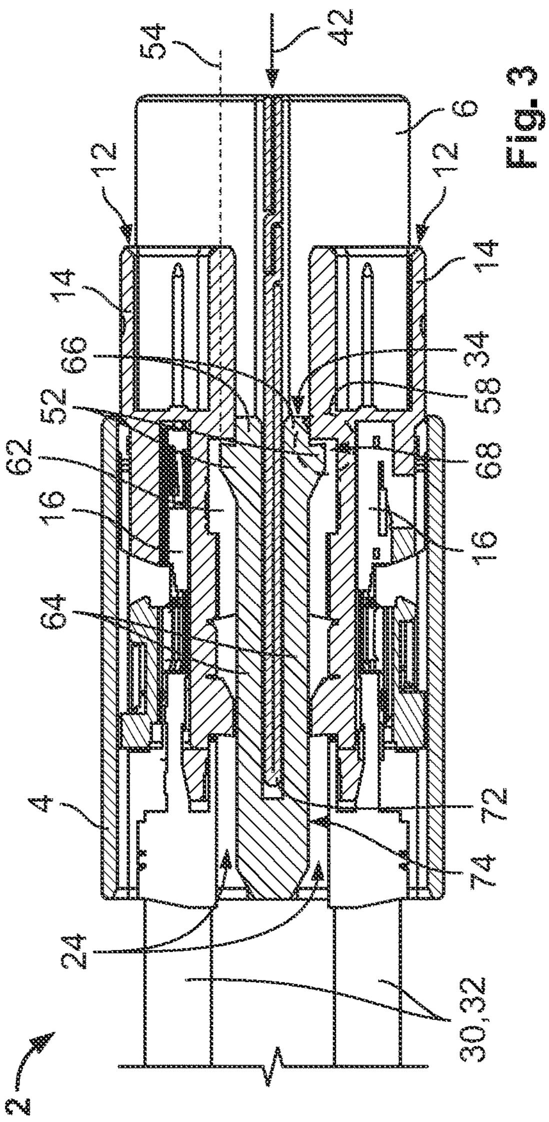
FIG. 3 shows a schematic sectional view of a connector according to a second exemplary embodiment.

According to the alternative embodiment shown in FIG. 3, free or distal end 68 of latching lance 64 can point in a direction opposite to shield insertion direction 42. In this case, free or distal end 68 with blocking section 66 is arranged in shield insertion direction 42 forward of proximal end 74 of latching lance 64. As can be clearly seen in FIG. 6, the TPA function of shield element 6 explained above takes effect in this embodiment already without shield element 6 having to be pushed deep into shield receptacle 34.

FIG. 4 shows a sectional view of connection device 22 with above connector 2 and with a mating connector 20 that is configured to be complementary to connector 2. Connector 2 and mating connector 20 are configured to be plugged together, wherein shield element 6 of connector 2 in the plugged state 76 projects at least in sections into mating connector 20.

Mating connector 20 can comprise a connector housing 78 configured analogously to contact housing 4 of connector 2. In connector housing 78, a mating contact 18 of mating connector 20 for each contact unit 12 can be received in a latching manner. Each mating contact 18 is there configured to be complementary to and plugged together with associated contact unit 12. In plugged state 76, shield element 6 projects into mating connector 20 to a point to which a shield braid 36 or a shield film 38 of a wire 30 or cable 32 leading to the respective mating contact 18 extends. Shield element 6 preferably surrounds the respective mating contact 18 at least in sections from at least three, in particular four, adjacent sides.

As shown in FIG. 4, shield element 6 can secure a further latching connection 58 between mating contact 18 and mating connector 20, in which shield element 6 also in mating connector 20 abuts against one or more latching lances 64. In other words, shield element 6 can also fulfill an analog TPA function as well as a secondary securing function for mating contacts 18.

It is indicated in FIG. 7 by dashed lines 90 that shield element 6 can also be configured to be attached by attachment section 44 to mating connector 20. In particular, shield element 6 can comprise further latching tabs 46 which can latch with latching recesses (not shown) or latching edges (not shown) of mating connector 20. This simplifies the pre- and/or final assembly of shield element 6.

Finally, the manufacturing process of shield element 6 shall be explained by way of example with reference to FIGS. 7 to 10. After a punching process, shield element 6 can be present as a blank 80 having the punching contour 40 shown in FIG. 7. In particular, later latching tabs 46 and later lock section 72 can already be seen. In addition, shield element 6 comprises two catch sections 82, for example, a tine 84 and a pocket 86, at positions that are symmetrically oppositely disposed with regard to later lock section 72.

First, latching tabs 46 are bent out at an angle and tine 84 is bent out to the same side perpendicular to the plane of blank 80. Blank 80 is then bent at long bending edges 88 into the shape shown in FIG. 8 with a U-shaped channel. Latching tabs 46 and tine 84 there point away from the channel. Blank 80 is then bent at lock section 72 so that tine 84 enters pocket 86 (see FIG. 9). Finally, tine 84 is bent back to create the catch (see FIG. 10). The resulting shield element 6 is shown in a perspective view in FIG. 1.

Instead of the punching-bending process just explained, shield element 6 can also be produced by welding and/or plugging together pieces of sheet metal. In particular, a modular principle can be used there. Shield element 6 can also be sintered, cast, or sprayed. A 3D printing process is also suitable for producing shield element 6.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A housing assembly for a connector comprising: a shield element; and a contact housing, wherein said contact housing comprises: at least one contact chamber for receiving a contact unit of said connector, at least one latching section which is movable between a latching position and a release position and which is configured in said latching position to enter into a latching connection with said contact unit to be received, at least one blocking section which is connected to said at least one latching section in a motion-transmitting manner, and a shield receptacle which is configured to receive at least in part said shield element, wherein said at least one blocking section projects at least in part into said shield receptacle when said at least one latching section is located in its release position.

2. The housing assembly according to claim 1, wherein said at least one latching section in said latching position projects at least in part into said at least one contact chamber.

3. The housing assembly according to claim 1, wherein said shield element received in said shield receptacle in said latching position blocks said at least one latching section.

4. The housing assembly according to claim 1, wherein said at least one latching section and said at least one blocking section are connected integrally.

5. The housing assembly according to claim 1, wherein said shield receptacle extends at least in sections along said at least one contact chamber and surrounds said at least one contact chamber from at least three sides.

6. The housing assembly according to claim 1, wherein said shield receptacle forms an evasion recess which is configured to receive at least in part said at least one blocking section when said at least one latching section is located in its release position, and wherein said shield element comprises a lock section that can be received in said evasion recess.

7. The housing assembly according to claim 6, wherein said at least one latching section is formed by a self-supporting latching lance which extends at least sectionally between said at least one contact chamber and said evasion recess.

8. The housing assembly according to claim 7, wherein said shield receptacle is open at one side from a shield insertion direction and/or is accessible from the shield insertion direction, and wherein a free end of said latching lance points in the direction of or opposite to said shield insertion direction.

9. The housing assembly according to claim 1, wherein said contact housing comprises two contact chambers which run parallel to one another at least in sections, and said shield receptacle runs at least sectionally between said two contact chambers.

10. The housing assembly according to claim 9, wherein said at least one latching section extends at least sectionally between said two contact chambers.

11. The housing assembly according to claim 1, wherein said contact housing comprises two latching sections which are configured to be movable in their latching position or their release position toward or away from one another.

12. A connector comprising: a housing assembly including a shield element and a contact housing, said contact housing including at least one contact chamber, said contact housing including at least one latching section which is movable between a latching position and a release position, said contact housing including at least one blocking section which is connected to said at least one latching section in a motion-transmitting manner, and said contact housing including a shield receptacle which is configured to receive at least in part said shield element, wherein said at least one blocking section projects at least in part into said shield receptacle when said at least one latching section is located in its release position; and at least one contact unit for contacting mating contacts of a mating connector, wherein said at least one contact unit is received in said at least one contact chamber of said contact housing and is in a latching connection with said at least one latching section, and wherein said shield element is received in said shield receptacle and secures said latching connection.

13. The connector according to claim 12, wherein said at least one latching section in said latching position projects at least in part into said at least one contact chamber.

14. The connector according to claim 12, wherein said shield element received in said shield receptacle in said latching position blocks said at least one latching section.

15. The connector according to claim 12, wherein said shield receptacle extends at least in sections along said at least one contact chamber and surrounds said at least one contact chamber from at least three sides.

16. The connector according to claim 12, wherein said shield receptacle forms an evasion recess which is configured to receive at least in part said at least one blocking section when said at least one latching section is located in its release position, and wherein said shield element comprises a lock section that can be received in said evasion recess.

17. The connector according to claim 12, wherein said contact housing comprises two contact chambers which run parallel to one another at least in sections, and said shield receptacle runs at least sectionally between said two contact chambers, said at least one contact unit comprises two contact units received in the corresponding two contact chambers.

18. A connection device comprising: a connector including a housing assembly and at least one contact unit for contacting mating contacts of a mating connector, the housing assembly including a shield element and a contact housing, said contact housing including at least one contact chamber, said contact housing including at least one latching section which is movable between a latching position and a release position, said contact housing including at least one blocking section which is connected to said at least one latching section in a motion-transmitting manner, and said contact housing including a shield receptacle which is configured to receive at least in part said shield element, wherein said at least one blocking section projects at least in part into said shield receptacle when said at least one latching section is located in its release position, wherein said at least one contact unit is received in said at least one contact chamber of said contact housing and is in a latching connection with said at least one latching section, and wherein said shield element is received in said shield receptacle and secures said latching connection; and a mating connector that is configured to be complementary to said connector, wherein said connector and said mating connector are configured to be plugged together, and wherein said shield element of said connector in the plugged state projects at least sectionally into said mating connector.

19. The connection device according to claim 18, wherein said shield element in said plugged state surrounds a mating contact of said mating connector at least sectionally from at least three sides.

20. The connection device according to claim 18, wherein said shield element comprises at least one attachment section with which said shield element is attachable to said contact housing and/or to said mating connector.

* * * * *